Sept. 27, 1960     C. OTTO     2,954,216
GRAVITY FLOW LIQUID AND GAS CONTACTOR
Filed Jan. 14, 1957

INVENTOR
CARL OTTO
BY Beale and Jones
ATTORNEYS

United States Patent Office 2,954,216
Patented Sept. 27, 1960

2,954,216

GRAVITY FLOW LIQUID AND GAS CONTACTOR

Carl Otto, Manhasset, N.Y., assignor to Otto Construction Corporation, New York County, N.Y.

Filed Jan. 14, 1957, Ser. No. 633,922

5 Claims. (Cl. 261—21)

This invention relates to apparatus for scrubbing, cooling or washing a gaseous material with an upwardly flowing stream of gas with a liquid for example, utilizing chemical or physical properties of a component of the gaseous material.

In order to provide a large contact surface of liquid for removing constituents from a gas or for cooling the gas, it has in the past been conventional to utilize a packed tower, or a tower containing a large number of grids over which the liquid cascades. The filling or packing for the tower has been made of wood, ceramics, metal filings, and similar material. These conventional types of apparatus are well known and have proved extremely efficient. However, difficulties in operation, such as a high pressure drop through the packing, a tendency of solid materials to deposit in and plug the passages, and a tendency of loose materials to pack and/or form channels, for example, have presented obstacles not easily overcome. These problems are exemplified in the use of "straw oil" for the purpose of scrubbing "benzol" from coke oven gas, wherein there is a tendency for gums to form in the straw oil and for the gums to block the passages through and between the grids or solid particles. It is a difficult, time-consuming, and hazardous procedure to clean or replace the packing or filling. To overcome the difficulties inherent in the use of a packed or similar tower, spray scrubbers have been developed; such as, for example, the United States patents of Otto, 2,675,215 and 2,747,847, and Manuel 2,753,949. These patents are representative of the prior art apparatus upon which this invention is an improvement. In this type of prior art apparatus it has been found that, for greatest efficiency, it is necessary to recirculate the liquor in the different compartments of the tower. Pumps have been used to accomplish the recirculation, and it has also been found that for the most efficient operation, a hydrostatic head should be provided to yield a pressure of at least 5 pounds/in.² at the spray nozzles. It has been suggested to flow the liquor in a tower from one compartment to the next by means of gravity, and disperse the liquid downwardly in each compartment, thus doing away with pumps; such, for example, as is shown in the patent granted to Wethly, 2,568,875. In order for apparatus such as that disclosed in the Wethly patent to operate, the sprays must be located a considerable distance below the bottom of the preceding compartment for spraying it into the next compartment. Since this distance is substantial, a large space at the top of each compartment is lost and is not available for providing contact between the gas and the liquid. The present invention is an improvement on these prior art methods and apparatus.

Briefly, this invention resides in providing an apparatus whereby a liquid is passed downwardly through a tower a sufficient distance to obtain a high hydrostatic head whereby upwardly and/or downwardly directed spraying means will produce a stream of finely divided liquid particles which are distributed throughout the entire available contact space.

Accordingly, it is an object of this invention to provide an apparatus utilizing a multiple compartment tower in which a liquid is passed generally downwardly therethrough and a gas is passed upwardly therethrough, and the liquid collected from one compartment is by-passed through or around at least the next lower compartment and distributed in a still lower compartment, whereby a sufficient hydrostatic head is developed to distribute finely divided particles of a liquid throughout the entire contact space of the last mentioned compartment.

It is an additional object of this invention to provide apparatus whereby at least two upward separate paths for the gas are provided, for example, by use of means adapted to pass one stream of gas only through alternating vertically disposed compartments and additional means is utilized for passing a second stream of gas through another set of alternate vertically arranged compartments, and wherein a liquid, collected in upper compartments, is utilized so that a sufficient hydrostatic head is accumulated to spray said liquid throughout said compartments.

A further object of this invention is to provide an apparatus whereby a turbulent, uniform, and relatively unobstructed flow of gas is directed upwardly through at least one vertical series of separate compartments, containing means for distributing finely divided particles of a liquid therein, and to utilize a means and method of distributing a liquid, collected in said compartments, wherein gravity provides the sole source of pressure on said liquid.

Other objects will be apparent from a consideration of the following description of the invention.

Figure 1:
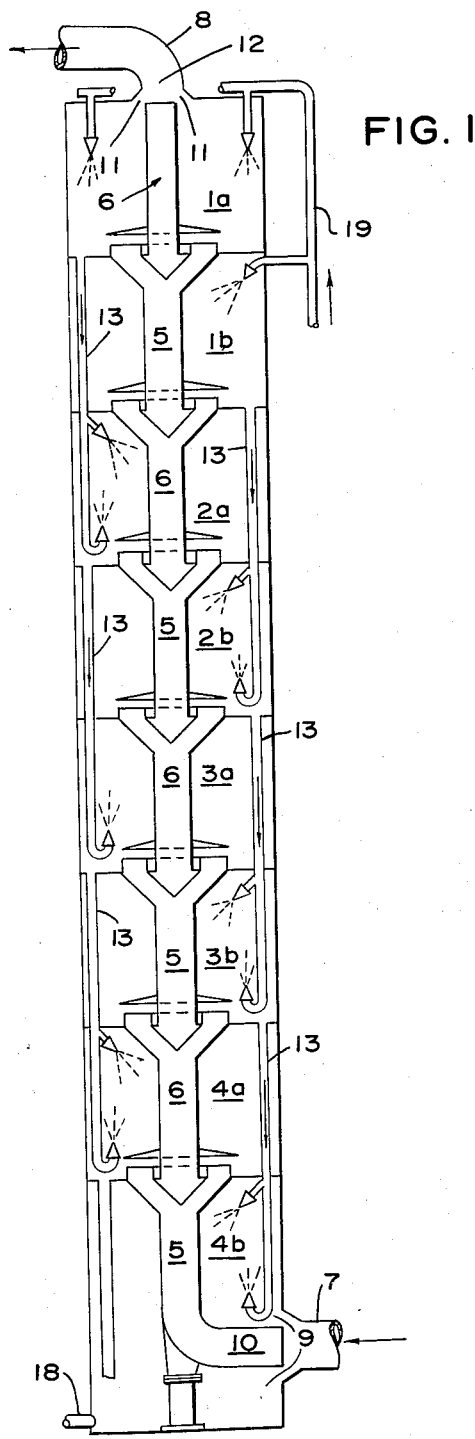
Fig. 1 is a schematic representation of a vertical cross section through the apparatus of the invention.

The apparatus comprises a tower, having a cross section of any desired shape, which is provided with a gas inlet 7 and a liquid outlet 18 at the bottom thereof and a gas outlet 8 and liquid inlet means 19 at the top thereof. The tower is divided into superposed chambers or compartments by transversely extending partitions 23 which are preferably horizontal. In the preferred and illustrated embodiment, adjacent chambers or compartments do not communicate directly with one another. Alternate compartments, however, are in direct communication with one another. Thus means are provided to pass the gas, flowing upwardly through the tower, in two separate streams, and to pass the liquid, flowing downwardly through the tower, in two streams. each in contact with and countercurrent to each of the said gas streams. The primary purpose of providing such means is to utilize gravity for spraying the liquid in the chambers or compartments in such manner that substantially the entire contact space is utilized. One set of alternate compartments 1a, 2a, 3a, 4a is connected by a set of gas conduits 5, thus providing means for establishing one stream of gas. The other stream of gas is established by the remaining alternate compartments 1b, 2b, 3b, 4b, which communicate directly with one another by another set of gas conduits 6. Conduits 13, having spray means, are provided for the liquid so that the latter is passed countercurrently to the two gas streams in separate flow paths corresponding to said gas streams. The apparatus will now be described in detail.

Any desired number of compartments of any desired dimensions may be used. The only limitation as to the dimensions will be obvious from the discussion below of the fact that there must be a sufficient hydrostatic head to provide adequate distribution of the liquid. The horizontal planar partition or dividing wall member 23 between adjacent compartments may be of any desired shape and orientation; for instance, it may slope toward an opening therein which is connected to the downwardly extending conduit 13 for withdrawing liquid. However, a substantially horizontal wall between adjacent compartments has been found to be perfectly satisfactory.

Means 19, including spray heads (not numbered in Fig. 1) are provided for introducing liquid at the top of the tower. The first two compartments 1a, 1b are supplied directly by said means 19, to which the liquid is supplied under pressure as by utilizing a pump or other conventional apparatus (not shown). Each compartment is provided with a gas conduit 5, 6, closed off from the compartment through which it passes, and adapted to conduct gas from the compartment immediately therebelow, or in the case of the top and bottom compartments, to communicate directly with the gas outlet and gas inlet. The tower is also provided with liquid outlet means 18 at the bottom thereof. Gas inlet and outlet means 7, 8 are utilized at the bottom and top of the tower, respectively.

At least two separate and distinct flow paths for separate streams of gas are provided by means of a series of conduits 5, 6. At least two passageways 9, 10 in the shape of a "doughnut ring," from the gas inlet 7 provide the initial division of the gas into at least two streams. In the illustrated preferred embodiment each of the said gas conduits in said series serves to conduct one gas stream through or around one compartment from the next lower to the next higher compartment, without contact with the liquid in said one compartment, and thereby by-passing the latter. At the top of the tower at least two passageways 11, 12 reunite the separate streams of gas. Thus it can be seen that the separate and similar flow paths for the gas or vapor in the illustrated apparatus are: (1) from the gas inlet conduit 7 through a stream-dividing passageway 10, sequentially through a first set of alternate compartments 4a, 3a, 2a, 1a in contact with the liquid therein, by means of conduits 5 which by-pass a second set of alternate compartments 4b, 3b, 2b, 1b, and finally to the gas outlet 8 by way of one of the passages 11 at the top of the tower, and (2) from the gas inlet 7 through the other stream-dividing passageway 9 at the bottom of the tower, by means of the conduits 6 between alternate compartments, sequentially through the second set of alternate compartments 4b, 3b, 2b, and 1b in contact with the liquid therein, whereby the first set of alternate compartments 4a, 3a, 2a, 1a is by-passed, and finally through another of the passageways 12 at the top of the tower wherein the second stream is reunited with the first stream and passes through the gas outlet 8. Depending upon the dimensions of each compartment, each of the gas conduits may by-pass more than one compartment, in which case there would be three or more separate gas streams or flow paths through the tower.

At the top of each of the vertical gas conduits 5, 6 there is provided a number of forks or branches 20 in the conduit (see Fig. 2) so that the gas which passes through the compartment in contact with the liquid spray outside of the conduit may pass around the branches and enter another of the conduits 5, 6 which leads from the top of this compartment. The forks 20, which may be two in number as shown in the drawings, but are preferably more than two, for example, four, terminate in an annular element 22 within the bottom of the compartment, said annular element assisting in giving a turbulent flow to the gas within each compartment and serving to prevent liquid from flowing downwardly through the gas conduits. Above each annular element 22, a baffle or skirt means 21 is utilized to give the gas stream turbulence in its flow through each compartment, and to prevent entry of liquid into the gas conduits. This baffle or skirt may take the shape of a downwardly sloping annular ring, and may be attached to the gas conduit in that compartment.

The flow paths of the two streams of absorbing or direct cooling liquid will now be described. Briefly, one stream of liquid is sprayed in one group of alternate compartments 1a, 2a, 3a, 4a, and the other stream of liquid is sprayed in the other group of alternate compartments 1b, 2b, 3b, 4b. From the top compartment 1a the partially spent liquid passes through conduit 13 to a lower compartment 2a. The downwardly directed liquid conduit 13 passes completely through or around at least one compartment, such as the one next to the top 1b, thereby maintaining the liquid out of contact with the gas in said one compartment. Each of the downwardly directed liquid conduits terminates in a lower spray ring header 14 and/or an upper spray ring header 16. In the illustrated embodiment the liquid flows from top compartment 1a through one of the liquid conduits 13, by-passing one compartment, 1b, to a lower compartment 2a, through one of the liquid conduits 13, skipping or by-passing the next lower compartment 2b, to one of the next lower compartments 3a, then through one of the liquid conduits 13, by-passing a still lower compartment 3b, to the next to the last compartment 4a, then through the lowermost compartment 4b, by means of a liquid conduit leading from the next to last compartment 4a, out of substantial contact with the gas in the last compartment, to the bottom of the tower, and finally to the liquid outlet 18. The other flow path for the liquid is from the second from the top compartment 1b through one of the downwardly extending liquid conduits 13, by-passing at least one still lower compartment 2a to another compartment 2b, then through another downwardly directed liquid conduit 13, by-passing at least one lower compartment 3a, to a still lower compartment 3b, then through another downwardly directed liquid conduit 12, by-passing the next to the bottom compartment 4b, from which it passes to the liquid outlet 18.

Figure 2:
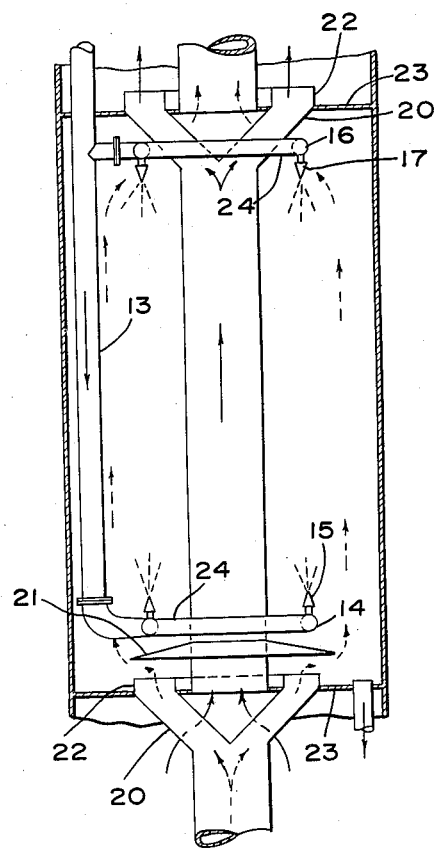
Fig. 2 is a schematic representation of a cross section, shown more in detail, of a portion of Fig. 1.

Referring to Fig. 2, the preferred arrangement of the spraying nozzles and the flow paths of the liquid and gas may be seen. The upwardly directed solid-line arrows indicate the flow of gas in the path which by-passes the chamber or compartment shown in this figure. The other stream of gas enters the illustrated compartment at the bottom thereof by way of the forked or branched cenral gas conduit and is shown by the broken-line arrows. The gas is then directed in a turbulent, free flow upwardly through the compartment, through the finely dispersed liquid, and then passes around the branches 20 of the gas conduit within that chamber to the next gas by-pass conduit. The liquid flows downwardly through a conduit 13, having been collected in a compartment higher than the one immediately above the chamber or compartment shown in Fig. 2. Two spray nozzle ring headers 14, 16 are attached to the liquid conduit 13, one at each extremity of the compartment shown in Fig. 2. The lower ring 14 is immediately above the baffle means 21, and has upwardly directed spray nozzles 15, and the upper ring 16 has downwardly directed spray nozzles 17. In place of a single ring of nozzles, two or more concentric rings may be provided, or radially directed branches may be attached to each of the rings. The opposed arrangement of spray nozzles within each compartment is highly advantageous in that the finely divided liquid particles, upon violent contact with one another, are believed to present a renewed surface which is of greater efficiency than the droplet surface presented at the instant before impact of the droplets. The liquid outlet conduit from the compartment immediately above that shown in Fig. 2 is not illustrated, for purposes of clarity.

The height of individual compartments will vary with the properties of the liquid and gas undergoing countercurrent contact. In the case of straw oil used to contact coke oven gas to extract benzol, and where only two gas streams and two liquid streams are used, a satisfactory height for each compartment has been found to be about 15 feet. This may vary with the viscosity and temperature of the liquid used, the temperature of the gas, the number of separate gas and liquid streams provided in each tower, and similar variables. The primary consideration is that a sufficient head be provided to give efficient spraying.

Some of the modifications and embodiments have been indicated in connection with the description of the illustrated embodiments. Others may also be made. For example, the shapes of the baffles and the collecting pans or partitions may be changed. The conduits 5, 6, 13 may be placed outside of the tower. Conventional accessory equipment such as sight glasses on the compartments, for the purpose of observing the operation of the apparatus, and float controlled valves, the floats being in the compartments, to give control of the rate of introduction of the liquid through the conduit 19 at the top of the tower, may also be used. Additional conventional accessory equipment may also be utilized.

The term "straw oil" is well understood in the art to be a liquid petroleum material. In place of straw oil the material known in the art as creosote oil may be substituted for scrubbing coke oven gas. Ordinarily, the coke oven gas has been partially purified to remove tarry materials and ammonia prior to treatment according to the present invention. The term "benzol" is understood in the art to include a mixture comprising benzene, toluenes, solvent naphtha, and xylenes, derived from coke oven gas. The apparatus of the invention may also be used to cool coke oven gas, in which case condensate from the coke oven gas may be refrigerated or cooled before being sprayed into some or all of the compartments.

I claim:

1. Gas and liquid contact apparatus comprising a tower having substantially vertical walls and a plurality of superposed compartments, said tower having gas inlet means and liquid outlet means at the bottom thereof and gas outlet means and liquid inlet means at the top thereof, means for conducting gas upwardly through each compartment, means for collecting liquid in each compartment and conducting it solely by gravity past at least one lower compartment to a still lower compartment and for dispersing said liquid therein in the form of fine droplets, said means for conducting gas upwardly through each compartment establishing a plurality of separate paths for the gas, said gas conducting means being arranged for conducting the gas from one compartment only to the compartment thereabove from which the liquid dispersed in said one compartment is collected, whereby the gas from said one compartment is maintained out of contact with liquid in any intermediate compartment, and whereby a sufficient hydrostatic head on the liquid is provided to assure the formation of said fine droplets and the dispersion thereof throughout substantially the entire contact space within each compartment.

2. The apparatus of claim 1 in which the means for conducting gas upwardly and liquid downwardly through the tower are located entirely within the walls of the tower.

3. The apparatus of claim 1 in which each liquid conducting means and each gas conducting means is adapted to conduct the fluid past only one compartment.

4. The apparatus of claim 1 in which the means for dispersing the liquid in each lower compartment is in the form of two liquid dispersing devices, one for directing liquid droplets upwardly from the bottom of the compartment, and the other for directing liquid droplets downwardly from the top of the compartment, whereby the droplets forcibly contact one another to provide newly exposed liquid surfaces.

5. The apparatus of claim 4 in which the bottom of each compartment is provided with gas inlet means, baffle means is provided under the bottom liquid dispersing device and over said gas inlet means to the compartment, whereby a turbulent flow of gas is provided and entry of liquid droplets into the gas conducting means is prevented.

References Cited in the file of this patent

UNITED STATES PATENTS

| | | |
|---|---|---|
| 1,952,099 | Shoeld | Mar. 27, 1934 |
| 2,662,756 | McIlvaine | Dec. 15, 1953 |
| 2,725,343 | Lambert | Nov. 29, 1955 |
| 2,753,949 | Manuel | July 10, 1956 |